(12) United States Patent
Shi et al.

(10) Patent No.: US 11,361,002 B2
(45) Date of Patent: Jun. 14, 2022

(54) METHOD AND APPARATUS FOR RECOGNIZING ENTITY WORD, AND STORAGE MEDIUM

(71) Applicant: BEIJING BAIDU NETCOM SCIENCE AND TECHNOLOGY CO., LTD., Beijing (CN)

(72) Inventors: Yabing Shi, Beijing (CN); Shuangjie Li, Beijing (CN); Ye Jiang, Beijing (CN); Yang Zhang, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 4 days.

(21) Appl. No.: 17/249,001

(22) Filed: Feb. 17, 2021

(65) Prior Publication Data

US 2021/0256038 A1 Aug. 19, 2021

(30) Foreign Application Priority Data

Feb. 19, 2020 (CN) .......................... 202010103350.6

(51) Int. Cl.
*G06F 16/28* (2019.01)
*G06F 40/295* (2020.01)
(Continued)

(52) U.S. Cl.
CPC .......... *G06F 16/285* (2019.01); *G06F 40/295* (2020.01); *G06F 40/30* (2020.01); *G06N 20/00* (2019.01)

(58) Field of Classification Search
None
See application file for complete search history.

(56) References Cited

U.S. PATENT DOCUMENTS

| 2005/0108200 A1* | 5/2005 | Meik ..................... G06F 16/954 |
| 2012/0084293 A1* | 4/2012 | Brown ................... A61B 34/10 |
| | | 707/E17.083 |

(Continued)

FOREIGN PATENT DOCUMENTS

| CN | 106294341 A | 1/2017 |
| JP | 2002132811 A | 5/2002 |

(Continued)

OTHER PUBLICATIONS

Extended European Search Report for Application No. 21157264.9, dated Jun. 11, 2021, 8 pages.

(Continued)

*Primary Examiner* — Robert W Beausoliel, Jr.
*Assistant Examiner* — Cheryl M Shechtman
(74) *Attorney, Agent, or Firm* — Fay Sharpe LLP

(57) ABSTRACT

The disclosure discloses a method and an apparatus for recognizing an entity word. The method includes: obtaining an entity word category and a document to be recognized; generating an entity word question based on the entity word category; segmenting the document to be recognized to generate a plurality of candidate sentences; inputting the entity word question and the plurality of candidate sentences into a question-answer model trained in advance to obtain an entity word recognizing result; and obtaining an entity word set corresponding to the entity word question based on the entity word recognizing result.

9 Claims, 4 Drawing Sheets

(51) Int. Cl.
*G06F 40/30* (2020.01)
*G06N 20/00* (2019.01)

(56) References Cited

U.S. PATENT DOCUMENTS

| | | | |
|---|---|---|---|
| 2015/0026106 A1* | 1/2015 | Oh | G06F 40/205 |
| | | | 706/12 |
| 2016/0104075 A1* | 4/2016 | Chowdhury | G06F 40/211 |
| | | | 706/12 |
| 2017/0091175 A1* | 3/2017 | Kanayama | G06F 40/58 |
| 2018/0260382 A1 | 9/2018 | Beller et al. | |
| 2019/0065576 A1* | 2/2019 | Peng | G06F 16/3329 |

FOREIGN PATENT DOCUMENTS

| | | | | |
|---|---|---|---|---|
| JP | 2017211785 A | | 11/2017 | |
| WO | WO-2019084867 A1 * | | 5/2019 | G06F 16/3329 |

OTHER PUBLICATIONS

Office Action for Japanese Application No. 2021-022635, dated Jan. 4, 2022, 4 pages.

\* cited by examiner

METHOD AND APPARATUS FOR RECOGNIZING ENTITY WORD, AND STORAGE MEDIUM

CROSS-REFERENCE TO RELATED APPLICATION

The present application is based upon and claims priority to Chinese Patent Application No. 202010103350.6, filed on Feb. 19, 2020, the entirety contents of which are incorporated herein by reference.

FIELD

The disclosure relates to a field of information processing technologies in artificial intelligence technologies, and particularly relates to a method and an apparatus for recognizing an entity word, and a non-transitory computer readable storage medium.

BACKGROUND

Presently, construction of a knowledge map gets more and more attention in all trades and professions. For example, legal reasoning of a legal industry may be provided based on a knowledge map of a legal system. The construction of the knowledge map depends on mining for an entity word.

SUMMARY

Embodiments of the disclosure provide a method for recognizing an entity word. The method includes: obtaining an entity word category and a document to be recognized; generating an entity word question based on the entity word category; segmenting the document to be recognized to generate a plurality of candidate sentences; inputting the entity word question and the plurality of candidate sentences into a question-answer model trained in advance to obtain an entity word recognizing result; and obtaining an entity word set corresponding to the entity word question based on the entity word recognizing result.

Embodiments of the disclosure provide an apparatus for recognizing an entity word. The apparatus includes: one or more processors; a memory storing instructions executable by the one or more processors; in which the one or more processors are configured to: obtain an entity word category and a document to be recognized; generate an entity word question based on the entity word category; segment the document to be recognized to generate a plurality of candidate sentences; input the entity word question and the plurality of candidate sentences into a question-answer model trained in advance to obtain an entity word recognizing result; and obtain an entity word set corresponding to the entity word question based on the entity word recognizing result.

Embodiments of the disclosure provide a non-transitory computer readable storage medium having computer instructions stored thereon. The computer instructions are configured to cause a computer to execute a method for recognizing an entity word. The method includes: obtaining an entity word category and a document to be recognized; generating an entity word question based on the entity word category; segmenting the document to be recognized to generate a plurality of candidate sentences; inputting the entity word question and the plurality of candidate sentences into a question-answer model trained in advance to obtain an entity word recognizing result; and obtaining an entity word set corresponding to the entity word question based on the entity word recognizing result.

Other effects of the above alternative modes will be explained in the following with specific embodiments.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Description will be made below to a method and an apparatus for recognizing an entity word according to embodiments of the disclosure with reference to accompanying drawings. The entity word referred to in embodiments is a professional word in each industry, such as, "offer" in the legal industry.

In the related art, the entity word is mined based on professional documents accumulated in the industry. A professional terminology table in the industry is obtained. A corresponding entity word is mined in the professional documents based on a keyword matching technology.

However, such way for obtaining the entity word depends on a coverage of the professional terminology table. In most cases, the professional terminology table accumulated in the industry is very limited, causing a low recall rate of the entity word.

Any of the above embodiments of the disclosure has following advantages and beneficial effects.

The entity word category and the document to be recognized are obtained. The entity word question is generated based on the entity word category. The document to be recognized is segmented to generate the plurality of candidate sentences. The entity word question and the plurality of candidate sentences are inputted into the question-answer model trained in advance to obtain the entity word recognizing result. The entity word set corresponding to the entity word question is obtained based on the entity word recognizing result. In this way, it is implemented that the method for recognizing the entity word is used in a wide range, the recall rate of the entity word and the intelligence of entity word recognition are improved.

Figure 1:
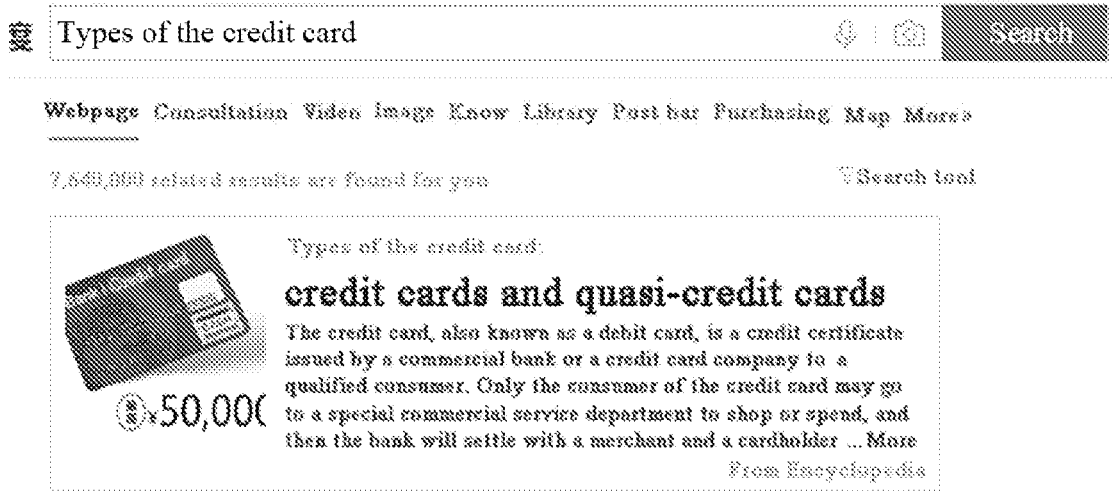
FIG. 1 is a schematic diagram illustrating a scene for recognizing an entity word according to an embodiment of the disclosure.

In order to solve a low recall rate of the entity word mentioned in the related art, the disclosure provides a method for recognizing an industry entity based on automation. A goal is to use question-answer technologies to achieve a high scalability and low-cost method for recognizing the entity word in the industry, thereby assisting upper-level application such as large-scale knowledge map construction, intelligent question-answer, and entity retrieval. For example, as illustrated in FIG. 1, when a search sentence entered by a user is "types of credit cards", the user may be provided with a corresponding entity word.

Figure 2:
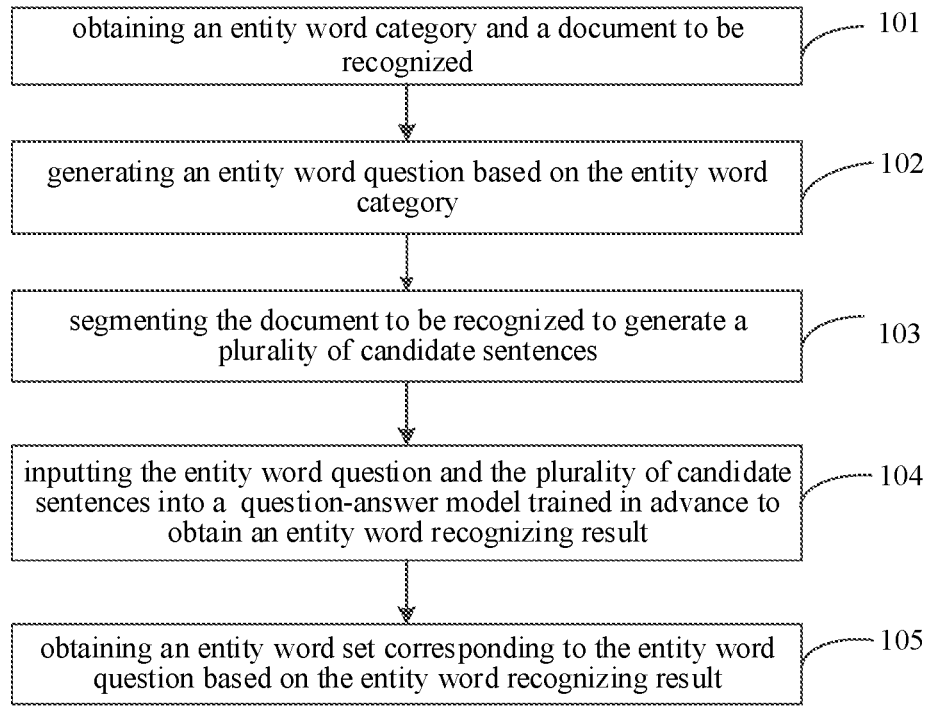
FIG. 2 is a flow chart illustrating a method for recognizing an entity word according to an embodiment of the disclosure.

In detail, FIG. 2 is a flow chart illustrating a method for recognizing an entity word according to an embodiment of the disclosure. As illustrated in FIG. 2, the method includes the following.

At block 101, an entity word category and a document to be recognized are obtained.

The entity word category refers to a technical field or the like to which an entity word to be obtained belongs. For example, the entity word category may be law, economy, medical care, etc. In addition, the document to be recognized is generally a professional document of an entity word to be recalled in a corresponding field.

It should be noted that, ways for obtaining the entity word category are different in different fields. As a possible implementation, a selection interface for the entity word category is provided for a user, and the entity word category is determined based on a tag selected by the user on the selection interface.

As another possible implementation, a subject of the document to be recognized may be determined based on content contained in the document to be recognized, and the entity word category may be determined based on content of the subject.

At block 102, an entity word question is generated based on the entity word category.

In embodiments of the disclosure, in order to mine a generalized feature of the entity word category, the entity word question is generated based on the entity word category. For example, when the entity word category is "person", the "person" may be processed as an entity word question, which is "who is the person mentioned in the document".

Of course, the ways for generating the entity word question are different based on the entity word category in different scenes. As a possible implementation, for a pre-trained learning model, an input of the model is the entity word category, and an output of the model is the entity word question. As another possible implementation, a correspondence between the entity word category and a question most commonly used in a field to which the entity word category belongs is constructed in advance, and the corresponding entity word question is determined based on the correspondence.

At block 103, the document to be recognized is segmented to generate multiple candidate sentences.

To facilitate the document to be recognized to match with the entity word question, the document to be recognized is segmented in this embodiment. For example, sentences are generated one by one based on semantic analysis and a punctuation mark such as a line break. The multiple candidate sentences are obtained, a length of the candidate sentence may facilitate subsequent processing and matching operations.

At block 104, the entity word question and the multiple candidate sentences are input into a question-answer model trained in advance to obtain an entity word recognizing result.

It should be understood that, the question-answer model is trained in advance. The question-answer model may recognize candidate sentences of an answer matching with the entity word question based on the inputted entity word question and the inputted multiple candidate sentences, and mark corresponding entity words in the candidate sentences.

Figure 3:
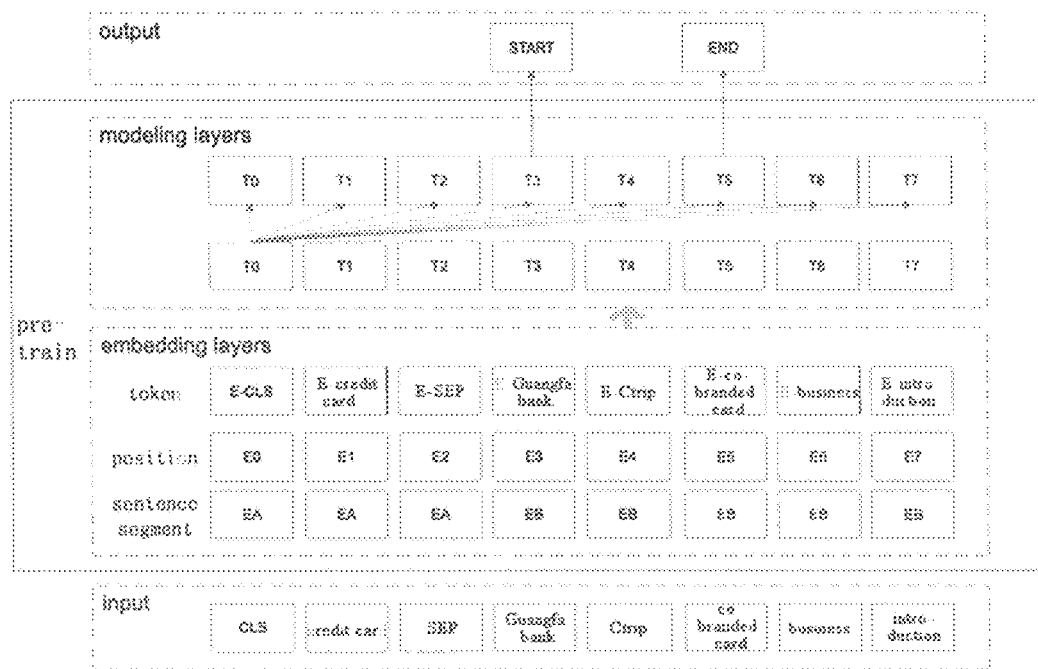
FIG. 3 is a schematic diagram illustrating a structure of a question-answer model according to an embodiment of the disclosure.

In detail, the question-answer model is constructed in advance. As illustrated in FIG. 3, the constructed question-answer model includes 4 layers. The first layer is an input layer, configured to input the entity word question and a sequence of candidate sentences corresponding to the entity word question. In order to facilitate identification of the model, a CLS is used at the beginning, and the candidate sentences are connected by an SEP when the entity word question and the sequence of candidate sentences are inputted. In this way, the entity word question and all the candidate sentences corresponding to the entity word question may be inputted. Of course, the entity word question and one or more corresponding candidate questions may also be inputted. In order to improve a recognizing efficiency, a candidate sentence obviously not related to the entity word question may also be excluded in advance (excluded based on a technology such as semantic recognition). Refer to the example illustrated in FIG. 1 again, for example, when the document to be recognized is a banking industry document, and the entity word question is "credit card", the input pf the input layer may be "XX Co-branded card business introduction".

The second layer of the question-answer model is an embedding layer, which corresponds to "embedding layers" in the FIG. 3 and is mainly configured to extract a feature of the inputted sequence. For example, the feature may be extracted by using three following ways. The first way may be word embedding. An inputted word sequence is transformed into corresponding word identification information, such as ID (identification) information of a word, by a pre-constructed word list, and then the transformed ID information is compressed into a low-dimensional vector by embedding technologies. The second way may be position embedding. Position information of each word in the inputted word sequence is compressed into a low-dimensional vector by the embedding technologies. The third way is paragraph segment embedding, which is used to characterize a paragraph in the document where the candidate sentence locates. As illustrated in FIG. 3, EA indicates that the candidate sentence appears in the first paragraph, and EB indicates that the candidate sentence appears in the second paragraph. The embedding layer may stitch the three vector features and input the three vector features to the modeling layer in the third layer.

The third layer of the question-answer model corresponds to modeling layers in FIG. 3. The modeling layers are mainly composed of transformer units. There may be multiple layers of transformer units in the modeling layers, and each transformer unit in each layer corresponds to a unit in the input layer. In other words, sequence lengths of the input layer, the embedding layer, and the modeling layer are all the same. The transformer units in a same layer are not connected to each other, and the transformer units between different layers are connected in pairs (considering aesthetic factors, two layers are illustrated in FIG. 3, and a connection between T0 in the first layer and transformer units in the previous layer is merely illustrated in FIG. 3)

The fourth layer of the question-answer model is an output layer. The output layer is a pointer network. Two pointers (a START pointer and an END pointer) are used to recognize a boundary of the entity word in the inputted candidate sentence.

An amount of sample entity word questions and sample recognizing documents are obtained during training the question-answer model. The sample recognizing document is segmented to obtain multiple candidate sample sentences. The entity word question and the multiple candidate sample sentences are inputted into an initial question-answer model.

An embedding layer of the initial question-answer model is controlled to extract a first feature of the sample entity word question and a second feature of the multiple candidate sample sentences. The first feature may be understood as the above ID (identification) information. The second feature may be understood as a feature vector into which the ID information and the position information described above are converted.

The first feature and the second feature are stitched to generate a sample feature. The sample feature is inputted into a modeling layer of the initial question-answer model. A sample entity word outputted by the modeling layer is obtained.

It is determined whether the sample entity word is consistent with a target entity word pre-labeled in the sample recognizing document. The training for the initial question-answer model is completed in response to determining that the sample entity word is consistent with the target entity word. A model parameter of the initial question-answer model is continuously adjusted in response to determining that the sample entity word is inconsistent with the target entity word until the sample entity word is consistent with the target entity word.

As described in the above embodiments, the modeling layer includes multiple layers of transformer units. The number of transformer sub-units in each layer is consistent with a length corresponding to the sample feature. The transformer sub-units at each layer of transformer unit are not connected with each other. Each transformer sub-unit in each layer is connected with all transformer sub-units in a previous layer in the multiple layers of transformer units. Then, in the actual training procedure, each sub-feature in the sample feature is inputted to a sub-unit of a transformer unit at a corresponding position in a first layer of the transformer unit. That is, the sub-features at the corresponding positions are sequentially inputted into the sub-units at the corresponding positions. An entity word decoding result outputted at a corresponding position of a last layer of a transformer unit of the modeling layer is obtained.

At block 105, an entity word set corresponding to the entity word question is obtained based on the entity word recognizing result.

In detail, the entity word set corresponding to the entity word question is obtained after the entity word recognizing result is obtained.

As a possible implementation, the entity word recognizing result includes the entity word and a probability corresponding to the entity word in the candidate sentence. In this embodiment, it may be determined based on the probability that the entity word of which the probability is greater than a preset threshold is the entity word in the entity word set.

As another possible implementation, as mentioned above, the entity word recognizing result includes the candidate sentence after labeling. An annotation sentence corresponding to the multiple candidate sentences outputted by the question-answer model trained in advance is recognized. A start identifier and an end identifier in the annotation sentence are recognized. Entity words between the start identifier and the end identifier is extracted to generate the entity word set.

A part of the entity words may be incorrect after the entity words are obtained. In order to ensure the accuracy of the obtained entity words, post-processing verification may be performed on the obtained entity words.

As a possible implementation, semantic analysis is performed on each entity word in the entity word set to obtain a semantic smoothness of each entity word. For example, the verification is performed based on syntactic information such as semantic dependency. The semantic smoothness is low when it is determined that the semantic dependency is disordered. The entity word of which the semantic smoothness in the entity word set is smaller than a preset threshold is filtered out, and then the entity word set after filtering is provided to the user.

As another possible implementation, a length of each entity word in the entity word set is obtained. An entity word in the entity word set with the length out of a preset length range is filtered out. The entity word set after filtering is provided to a user. The preset length range is used to filter out an entity word of which the length is too long or too short. The preset length range may be determined based on the entity word category.

It should be noted that verification processing ways of the above two examples may be executed independently or in combination, which are not limited here.

Therefore, with the method for recognizing the entity word according to embodiments of the disclosure, in an aspect, the generalization is strong. It may be ensured that a wide range of text features may be learned in the pre-training stage through the question-answer model trained in advance, such that a strong generalization is had. In another aspect, the recall rate is high. The question-answer model after deep learning may achieve a good accuracy and a good recall rate in a way of supplementing training samples and transferring learning. In another aspect, the model effect may be optimized only by supplementing the training samples without manual vocabulary construction.

In conclusion, with the method for recognizing the entity word according to embodiments of the disclosure, the entity word category and the document to be recognized are obtained. The entity word question is generated based on the entity word category. The document to be recognized is segmented to generate the multiple candidate sentences. The entity word question and the multiple candidate sentences are inputted into the question-answer model trained in advance to obtain the entity word recognizing result. The entity word set corresponding to the entity word question is obtained based on the entity word recognizing result. In this way, it is implemented that the method for recognizing the entity word is used in a wide range, the recall rate of the entity word and the intelligence of entity word recognition are improved.

Figure 4:
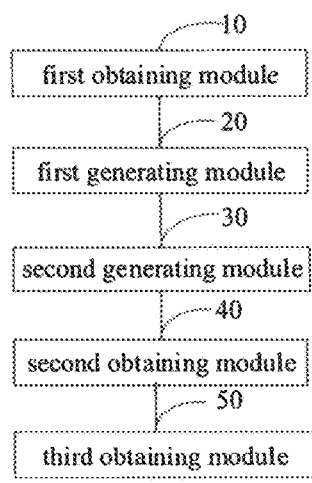
FIG. 4 is a block diagram illustrating an apparatus for recognizing an entity word according to an embodiment of the disclosure.

To achieve the above embodiments, the disclosure also provides an apparatus for recognizing an entity word. FIG. 4 is a block diagram illustrating an apparatus for recognizing an entity word according to an embodiment of the disclosure. As illustrated in FIG. 4, the apparatus for recognizing the entity word includes a first obtaining module 10, a first generating module 20, a second generating module 30, a second obtaining module 40, and a third obtaining module 50.

The first obtaining module 10 is configured to obtain an entity word category and a document to be recognized. The first generating module 20 is configured to generate an entity word question based on the entity word category. The second generating module 30 is configured to segment the document to be recognized to generate multiple candidate sentences. The second obtaining module 40 is configured to input the entity word question and the multiple candidate sentences into a question-answer model trained in advance to obtain an entity word recognizing result. The third obtaining module 50 is configured to obtain an entity word set corresponding to the entity word question based on the entity word recognizing result.

Figure 5:
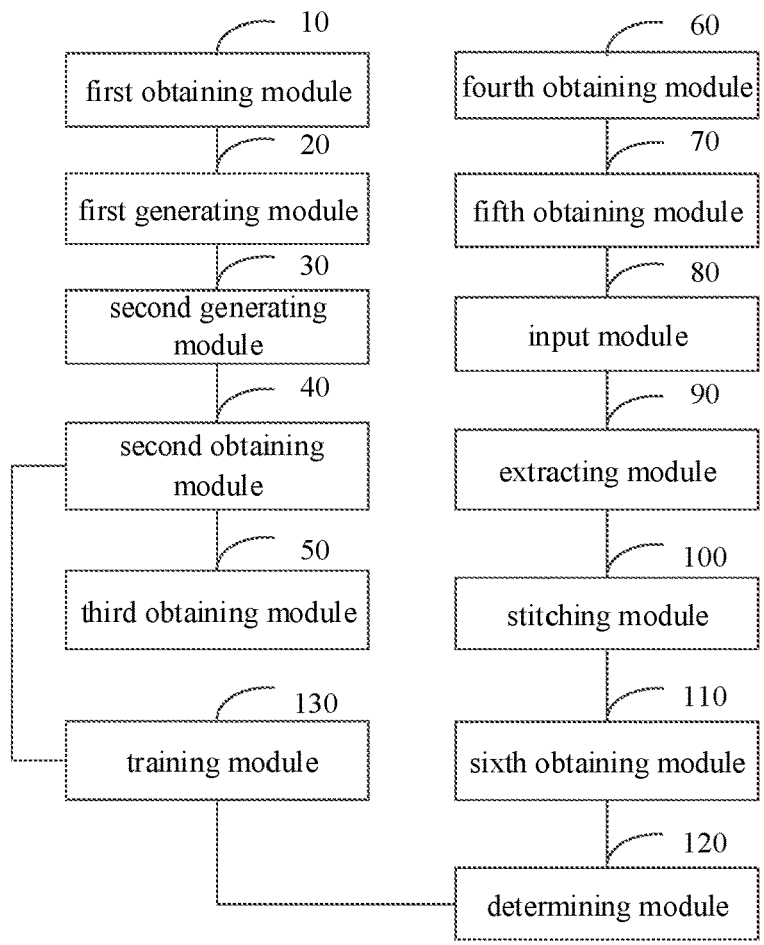
FIG. 5 is a block diagram illustrating an apparatus for recognizing an entity word according to an embodiment of the disclosure.

In some embodiments of the disclosure, as illustrated in FIG. 5, the apparatus also includes: a fourth obtaining module 60, a fifth obtaining module 70, an input module 80, an extracting module 90, a stitching module 100, a sixth obtaining module 110, a determining module 120, and a training module 130.

The fourth obtaining module 60 is configured to obtain a sample entity word question and a sample recognizing document. The fifth obtaining module 70 is configured to segment the sample recognizing document to obtain multiple candidate sample sentences. The input module 80 is configured to input the entity word question and the multiple candidate sample sentences into an initial question-answer model. The extracting module 90 is configured to control an embedding layer of the initial question-answer model to extract a first feature of the sample entity word question and a second feature of the multiple candidate sample sentences. The stitching module 100 is configured to stitch the first feature and the second feature to generate a sample feature. The sixth obtaining module 110 is configured to input the sample feature into a modeling layer of the initial question-answer model, and to obtain a sample entity word outputted by the modeling layer. The determining module 120 is configured to determine whether the sample entity word is consistent with a target entity word pre-labeled in the sample recognizing document. The training module 130 is configured to continuously adjust a model parameter of the initial question-answer model in response to determining that the sample entity word is inconsistent with the target entity word until the sample entity word is consistent with the target entity word.

Figure 6:
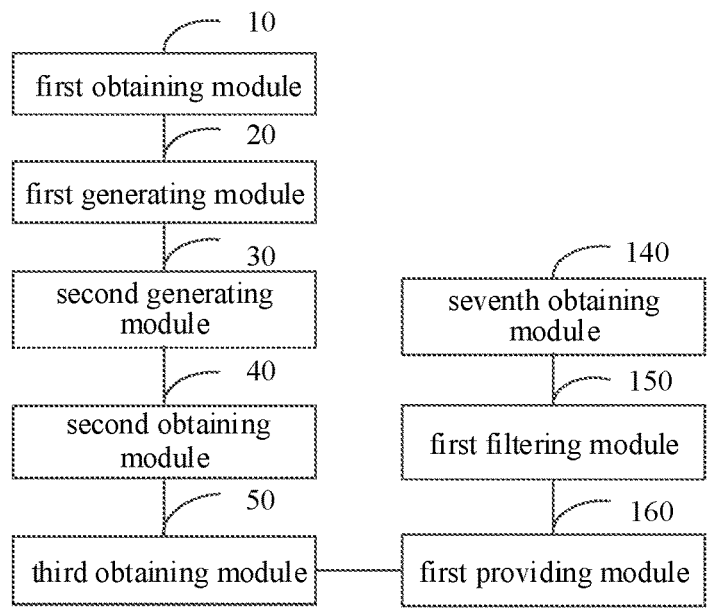
FIG. 6 is a block diagram illustrating an apparatus for recognizing an entity word according to an embodiment of the disclosure.

In some embodiments of the disclosure, as illustrated in FIG. 6, on the basis of FIG. 4, the apparatus also includes: a seventh obtaining module 140, a first filtering module 150, and a first providing module 160.

The seventh obtaining module 140 is configured to perform semantic analysis on each entity word in the entity word set to obtain a semantic smoothness of each entity word. The first filtering module 150 is configured to filter out an entity word in the entity word set with the semantic smoothness smaller than a preset threshold. The first providing module 160 is configured to provide the entity word set after filtering to a user.

Figure 7:
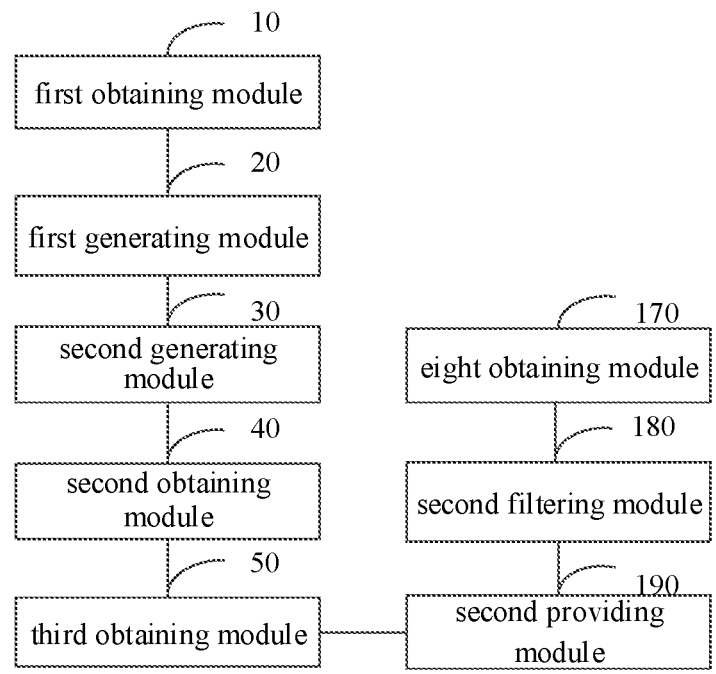
FIG. 7 is a block diagram illustrating an apparatus for recognizing an entity word according to an embodiment of the disclosure.

In some embodiments of the disclosure, as illustrated in FIG. 7, on the basis of FIG. 4, the apparatus also includes: an eight obtaining module 170, a second filtering module 180, and a second providing module 190.

The eight obtaining module 170 is configured to obtain a length of each entity word in the entity word set. The second filtering module 180 is configured to filter out an entity word in the entity word set with the length out of a preset length range. The second providing module 190 is configured to provide the entity word set after filtering to a user.

It should be noted that, the above description of the method for recognizing the entity word is also applicable to the apparatus for recognizing the entity word according to embodiments of the disclosure, so is the implementation principle, which is not elaborated here.

According to embodiments of the disclosure, the disclosure also provides an electronic device and a readable storage medium.

Figure 8:
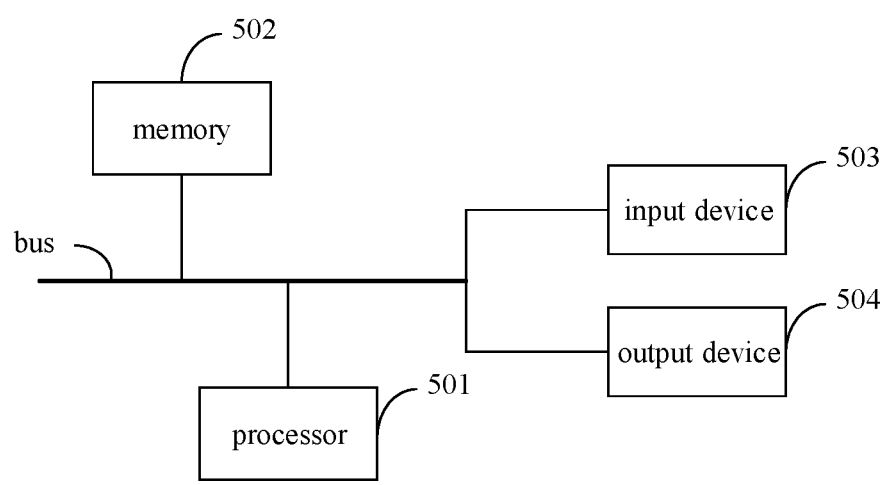
FIG. 8 is a block diagram illustrating an electronic device capable of implementing a method for recognizing an entity word according to embodiments of the disclosure.

As illustrated in FIG. 8, FIG. 8 is a block diagram illustrating an electronic device capable of implementing a method for recognizing an entity word according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 8, the electronic device includes: one or more processors 501, a memory 502, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 8, a processor 501 is taken as an example.

The memory 502 is a non-transitory computer readable storage medium provided by the disclosure. The memory is configured to store instructions executable by at least one processor, to enable the at least one processor to execute the method for recognizing the entity word provided by the disclosure. The non-transitory computer readable storage medium provided by the disclosure is configured to store computer instructions. The computer instructions are configured to enable a computer to execute the method for recognizing the entity word provided by the disclosure.

As the non-transitory computer readable storage medium, the memory 502 may be configured to store non-transitory software programs, non-transitory computer executable programs and modules, such as program instructions/module (such as the first obtaining module 10, the first generating module 20, the second generating module 30, the second obtaining module 40, and the third obtaining module 50 illustrated in FIG. 4) corresponding to the method for recognizing the entity word according to embodiments of the disclosure. The processor 501 is configured to execute various functional applications and data processing of the server by operating non-transitory software programs, instructions and modules stored in the memory 502, that is, implements the method for recognizing the entity word according to the above method embodiments.

The memory 502 may include a storage program region and a storage data region. The storage program region may store an application required by an operating system and at least one function. The storage data region may store data created according to predicted usage of the electronic device based on the semantic representation. In addition, the memory 502 may include a high-speed random access memory, and may also include a non-transitory memory, such as at least one disk memory device, a flash memory device, or other non-transitory solid-state memory device. In some embodiments, the memory 502 may optionally include memories remotely located to the processor 501, and these remote memories may be connected to the electronic device via a network. Examples of the above network include, but are not limited to, an Internet, an intranet, a local area network, a mobile communication network and combinations thereof.

The electronic device capable of implementing the method for recognizing the entity word may also include: an input device 503 and an output device 504. The processor 501, the memory 502, the input device 503, and the output device 504 may be connected via a bus or in other means. In FIG. 8, the bus is taken as an example.

The input device 503 may receive inputted digital or character information, and generate key signal input related to user setting and function control of the electronic device capable of implementing the method for recognizing the entity word, such as a touch screen, a keypad, a mouse, a track pad, a touch pad, an indicator stick, one or more mouse buttons, a trackball, a joystick and other input device. The output device 504 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:
1. A method for recognizing an entity word, comprising:
    obtaining an entity word category and a document to be recognized;
    generating an entity word question based on the entity word category;

segmenting the document to be recognized to generate a plurality of candidate sentences;

inputting the entity word question and the plurality of candidate sentences into a question-answer model trained in advance to obtain an entity word recognizing result; and obtaining an entity word set corresponding to the entity word question based on the entity word recognizing result;

wherein before inputting the entity word question and the plurality of candidate sentences into the question-answer model trained in advance to obtain the entity word recognizing result:

obtaining a sample entity word question and a sample recognizing document;

segmenting the sample recognizing document to obtain a plurality of candidate sample sentences;

inputting the entity word question and the plurality of candidate sample sentences into an initial question-answer model;

controlling an embedding layer of the initial question-answer model to extract a first feature of the sample entity word question and a second feature of the plurality of candidate sample sentences;

stitching the first feature and the second feature to generate a sample feature;

inputting the sample feature into a modeling layer of the initial question-answer model, and obtaining a sample entity word outputted by the modeling layer;

determining whether the sample entity word is consistent with a target entity word pre-labeled in the sample recognizing document; and continuously adjusting a model parameter of the initial question-answer model in response to determining that the sample entity word is inconsistent with the target entity word until the sample entity word is consistent with the target entity word.

2. The method of claim 1, wherein the modeling layer comprises a plurality of layers of transformer units, the number of transformer sub-units in each layer is consistent with a length corresponding to the sample feature, the transformer sub-units at each layer are not connected with each other, each transformer sub-unit in each layer is connected with all transformer sub-units in a previous layer in the plurality of layers, wherein inputting the sample feature into the modeling layer of the initial question-answer model comprises:

inputting each sub-feature in the sample feature to a sub-unit of a transformer unit at a corresponding position in a first layer of the transformer unit; and obtaining an entity word decoding result outputted at a corresponding position of a last layer of a transformer unit of the modeling layer.

3. The method of claim 1, further comprising:

performing semantic analysis on each entity word in the entity word set to obtain a semantic smoothness of each entity word;

filtering out an entity word in the entity word set with the semantic smoothness smaller than a preset threshold; and providing the entity word set after filtering to a user.

4. The method of claim 1, further comprising:

obtaining a length of each entity word in the entity word set;

filtering out an entity word in the entity word set with the length out of a preset length range; and providing the entity word set after filtering to a user.

5. The method of claim 1, wherein obtaining the entity word set corresponding to the entity word question based on the entity word recognizing result comprises:

recognizing an annotation sentence corresponding to the plurality of candidate sentences outputted by the question-answer model trained in advance;

recognizing a start identifier and an end identifier in the annotation sentence; and extracting an entity word between the start identifier and the end identifier to generate the entity word set.

6. An apparatus for recognizing an entity word, comprising:

one or more processors;

a memory storing instructions executable by the one or more processors;

wherein the one or more processors are configured to:

obtain an entity word category and a document to be recognized;

generate an entity word question based on the entity word category;

segment the document to be recognized to generate a plurality of candidate sentences;

input the entity word question and the plurality of candidate sentences into a question-answer model trained in advance to obtain an entity word recognizing result;

obtain an entity word set corresponding to the entity word question based on the entity word recognizing result;

obtain a sample entity word question and a sample recognizing document;

segment the sample recognizing document to obtain a plurality of candidate sample sentences;

input the entity word question and the plurality of candidate sample sentences into an initial question-answer model;

control an embedding layer of the initial question-answer model to extract a first feature of the sample entity word question and a second feature of the plurality of candidate sample sentences;

stitch the first feature and the second feature to generate a sample feature;

input the sample feature into a modeling layer of the initial question-answer model, and to obtain a sample entity word outputted by the modeling layer;

determine whether the sample entity word is consistent with a target entity word pre-labeled in the sample recognizing document; and continuously adjust a model parameter of the initial question-answer model in response to determining that the sample entity word is inconsistent with the target entity word until the sample entity word is consistent with the target entity word.

7. The apparatus of claim 6, wherein the one or more processors are configured to:

perform semantic analysis on each entity word in the entity word set to obtain a semantic smoothness of each entity word;

filter out an entity word in the entity word set with the semantic smoothness smaller than a preset threshold; and provide the entity word set after filtering to a user.

8. The apparatus of claim 6, wherein the one or more processors are configured to:

obtain a length of each entity word in the entity word set;

filter out an entity word in the entity word set with the length out of a preset length range; and provide the entity word set after filtering to a user.

9. A non-transitory computer readable storage medium having computer instructions stored thereon, wherein the computer instructions are configured to cause a computer to execute a method for recognizing an entity word, and the method comprises:
- obtaining an entity word category and a document to be recognized;
- generating an entity word question based on the entity word category;
- segmenting the document to be recognized to generate a plurality of candidate sentences;
- inputting the entity word question and the plurality of candidate sentences into a question-answer model trained in advance to obtain an entity word recognizing result;
- obtaining an entity word set corresponding to the entity word question based on the entity word recognizing result;
- wherein before inputting the entity word question and the plurality of candidate sentences into the question-answer model trained in advance to obtain the entity word recognizing result:
- obtaining a sample entity word question and a sample recognizing document;
- segmenting the sample recognizing document to obtain a plurality of candidate sample sentences;
- inputting the entity word question and the plurality of candidate sample sentences into an initial question-answer model;
- controlling an embedding layer of the initial question-answer model to extract a first feature of the sample entity word question and a second feature of the plurality of candidate sample sentences;
- stitching the first feature and the second feature to generate a sample feature;
- inputting the sample feature into a modeling layer of the initial question-answer model, and obtaining a sample entity word outputted by the modeling layer;
- determining whether the sample entity word is consistent with a target entity word pre-labeled in the sample recognizing document; and
- continuously adjusting a model parameter of the initial question-answer model in response to determining that the sample entity word is inconsistent with the target entity word until the sample entity word is consistent with the target entity word.

* * * * *